United States Patent [19]

Horowitz

[11] 4,112,961
[45] Sep. 12, 1978

[54] TRACTOR PROTECTION VALVE

[75] Inventor: Charles Horowitz, Niles, Ill.

[73] Assignee: Sloan Valve Company, Franklin Park, Ill.

[21] Appl. No.: 701,086

[22] Filed: Jun. 30, 1976

Related U.S. Application Data

[63] Continuation-in-part of Ser. No. 651,410, Jan. 22, 1976, Pat. No. 4,019,525.

[51] Int. Cl.² ............................................. B60T 15/36
[52] U.S. Cl. ...................................... 137/102; 303/29
[58] Field of Search ................. 137/102, 116, 107, 109, 137/111, 512; 303/28, 29, 30, 40

[56] References Cited

U.S. PATENT DOCUMENTS

| | | | |
|---|---|---|---|
| 2,859,763 | 11/1958 | Fites | 137/102 |
| 2,979,069 | 4/1961 | Valentine | 137/102 |
| 3,413,040 | 11/1968 | Horowitz | 137/102 X |
| 3,866,623 | 2/1975 | Klimek | 137/102 |
| 3,972,341 | 8/1976 | Wheless | 137/102 |
| 4,002,374 | 1/1977 | Horowitz | 137/102 X |

Primary Examiner—William R. Cline
Attorney, Agent, or Firm—Kinzer, Plyer, Dorn & McEachran

[57] ABSTRACT

Tractor protection valve means for use in the air brake system of a tractor-trailer vehicle combination to protect and maintain the braking system of the tractor includes a pair of valve housings. One of the valve housings (the pilot) is attached to the tractor dash control valve and includes a piston controlling communication between an inlet, a delivery port and an exhaust port. The second housing has a tractor supply port connected to the pilot delivery port, in addition to trailer supply and control ports, a tractor control port, and an exhaust port. The pilot valve attached to the dash control valve contains the control portions of the valve combination with the piston in the other housing being movable in response to air pressure supplied from the pilot to control communications between all of the ports connected thereto.

9 Claims, 1 Drawing Figure

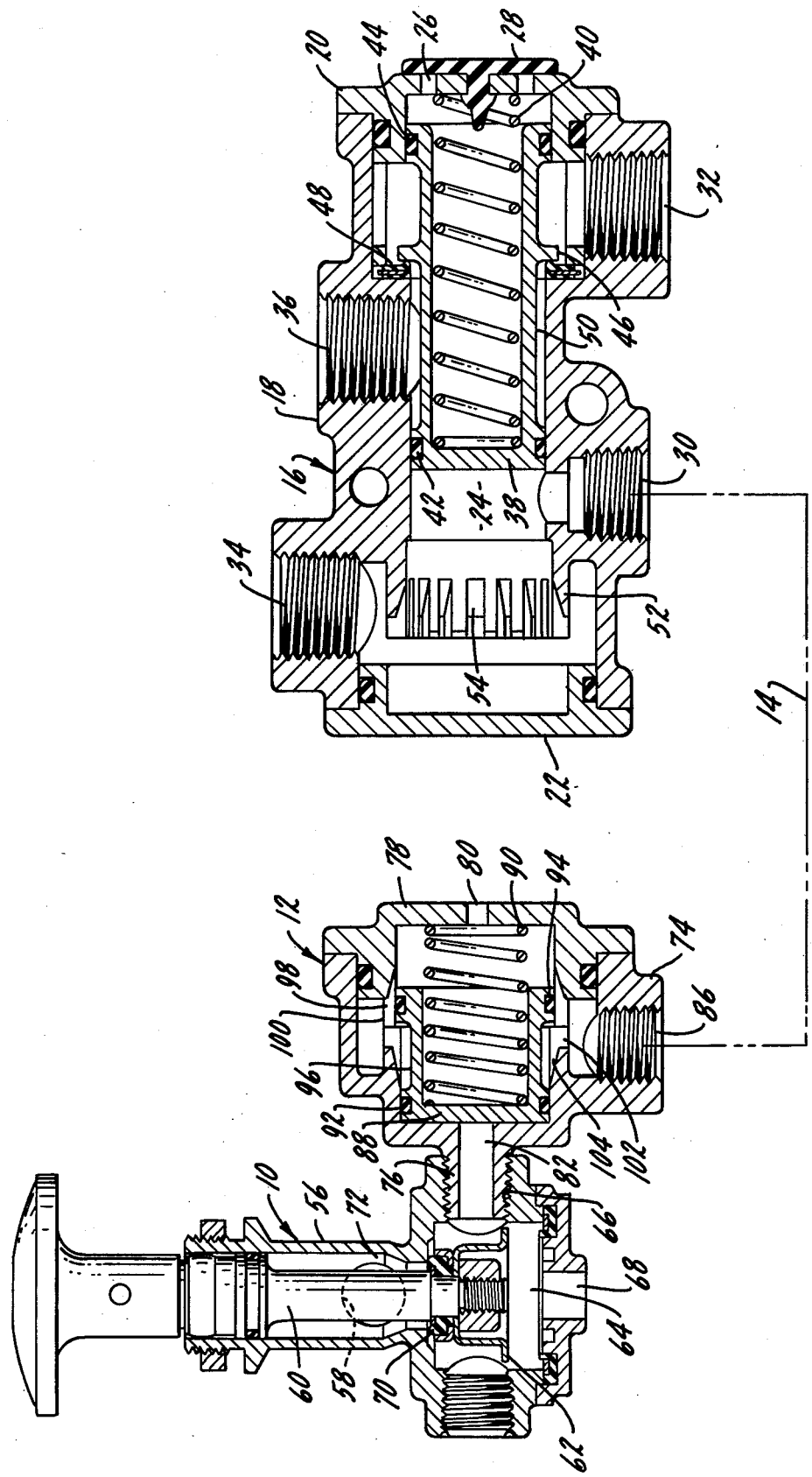

TRACTOR PROTECTION VALVE

SUMMARY OF THE INVENTION

The present invention relates to tractor protection valves for use in tractor-trailer vehicle combinations and is a continuation in part of my co-pending application Ser. No. 651,410 filed Jan. 22, 1976, now U.S. Pat. No. 4,019,525.

A primary purpose of the present invention is to provide a tractor protection valve of the type described in the above-mentioned copending application, but with the control portion of the valve attached to the tractor dash control valve.

Another purpose is a simply constructed reliably operable tractor protection valve which is adapted for use as an integral unit or as separate components, one of which may be attached to the tractor dash control valve.

Another purpose is a tractor protection valve means having two separate valve housings, one of which contains the control portion of the valve.

Other purposes will appear in the ensuing specification, drawing and claims.

BRIEF DESCRIPTION OF THE DRAWINGS

The invention is illustrated diagrammatically in the attached cross section through the described valve means.

DESCRIPTION OF THE PREFERRED EMBODIMENT

In the drawing, a dash control valve is indicated generally at 10 and may for example be of the type shown in my copending application Ser. No. 574,469, filed May 7, 1975, now U.S. Pat. No. 3,962,594. Attached to dash control valve 10 is a tractor protection pilot 12 which is connected by a conduit indicated diagrammatically at 14 to a tractor protection valve 16.

Valve 16 has a housing including a body portion 18 closed at its right end by a cap 20 and at its left end by a cap 22. An axially-extending bore 24 is formed within the housing. End cap 20 carries a plurality of exhaust ports 26 controlled by a flexible flapper valve 28.

Body portion 18 of the housing includes a tractor supply port 30 which will be connected to the tractor air supply line (emergency) through the tractor protection pilot as described hereinafter. Body portion 18 further includes a tractor control port 32 which will be connected to the tractor control line (service); a trailer supply port 34 which will supply pressure to the trailer brake system; and a trailer control port 36 which will supply an air pressure control signal to the trailer service brake means.

A piston 38 is reciprocal within chamber 24 and has a hollow interior mounting a coil spring 40 which urges the piston to the position shown in the drawing. Piston 38 carries seal rings 42 and 44 at opposite ends thereof which are in sealing engagement with portions of the valve housing. An outwardly-extending flange 46 provides a sealing surface to seat upon a seal member 48 carried by housing body 18. A circumferentially extending groove 50 is formed between flange 46 and seal ring 42 to provide communication between tractor control port 32 and trailer control port 36, as will be described.

Tractor supply port 30 and trailer supply port 34 are in direct communication with each other as there is no control member positioned in the housing to effect the passage between these ports. There was such a control member in the above-mentioned copending application, however, in the present instance such a control member has been moved to a separate housing. The structure of housing 16 is completed by a peripherally extending flange 52 having a series of grooves 54, which grooves function with the control member mentioned in the co-pending application, but removed to a separate housing herein.

Dash control valve 10 has a housing 56 with a supply port opening 58. A stem 60 is movable within housing 56 and carries a seal member 62 at its lower end. Seal member 62 is movable within a chamber 64 having an opening 66 to receive tractor protection pilot 12. An exhaust port 68 is in communication with chamber 64 and when stem 60 is moved in a downward direction, its seal member 62 closes exhaust port 68 with movement of an upper portion 70 of seal member 62 away from the entrance to chamber 72 containing stem 60 providing communication between supply port 58 and chamber 64, and thus with tractor protection pilot 12. Accordingly, movement of the dash control valve is effective to connect the emergency supply to the tractor protection pilot.

Pilot 12 includes a housing 74 having a boss 76 extending within passage 66. A cap 78 having an exhaust port 80 closes one end of housing 12. Boss 76 has an inlet passage 82 in communication with the interior of housing 74 and a delivery port 86 is in communication, through conduit 14, with tractor supply port 30 of valve 16.

Reciprocal within chamber 84 is a piston 88 having a hollow interior for mounting a coil spring 90. Piston 88 carries spaced seal members 92 and 94 adjacent opposite ends thereof with a peripherally extending groove 96 being formed on the exterior of the piston between the seals.

In radial alignment with port 86 is a series of circumferentially arranged ports 98 separated by dividers 100, the interior surface of which forms a bearing support for seal member 94 when piston 88 moves within chamber 84. In like manner there is a series of circumferentially arranged ports 102 separated by dividers 104 formed in housing 74, with the interior surface of the dividers forming a bearing surface for seal 92.

In operation, when the valve means is in the position shown, trailer supply port 34 is connected through port 30, conduit 14, and port 86 to exhaust port 80. Thus, any pressure in the trailer emergency supply system will be vented to exhaust. There is no communication between trailer control port 36 and tractor control port 32, as flange 46 is in sealing engagement with seal 48. Both springs are holding the two pistons in the positions shown.

When the operator moves the dash control valve to open communication between supply port 58 and chamber 64, pressure will be supplied through tractor protection inlet 82 to the left-hand side of piston 88. When pressure at supply port 58 has reached a certain level, for example 35 psi, piston 88 will begin its movement against the force of spring 90. Initial movement of the piston will cause seal 94 to move to a position closing communication between exhaust port 80 and port 86, thus effectively closing communication between the exhaust port and trailer supply port 34. Further movement of piston 88 in the same direction will open communication between inlet 82 and delivery port 86 through circumferential groove 96 in piston 88 and ports 102.

Thus, pressure from supply port 58 will be passed through tractor protection pilot 12 and conduit 14 to port 30 and to the trailer supply port 34. As the air pressure increases, piston 38 will be moved against the force of spring 40 toward cap 20 and any air trapped within the piston will be vented through exhaust ports 26. Such movement of the piston moves flange 46 away from seal 48, opening communication between tractor control port 32 and trailer control port 36. Thus, pressure at dash control valve port 58 will cause the air pressure systems of the tractor and trailer to be connected together.

In the event of a loss of pressure on either the tractor or trailer side of the supply line, both pistons 38 and 88 will return, under the urging of their respective springs, to the positions shown in the drawing. The control line between the tractor and trailer will be sealed and any air pressure within the trailer supply side of the system will be vented to atmosphere through exhaust port 80, thereby applying the trailer spring brakes or the trailer relay emergency valve.

Of significance is the fact that cap 22 on housing 16 may be replaced by cap 78 and the piston and spring of pilot 12. Thus, the tractor protection valve may be combined with the tractor protection pilot merely by the removal of cap 22 and housing 74. Accordingly, the tractor protection valve may be marketed as a single unit, or as separate units, as shown in conjunction with the dash control valve.

Whereas the preferred form of the invention has been shown and described herein, it should be realized that there may be many modifications, substitution and alterations thereto.

The embodiments of the invention in which an exclusive property or privilege is claimed are defined as follows:

1. Tractor protection valve means including a first housing having a chamber, tractor and trailer control ports and an exhaust port opening into said chamber, a piston movable in said chamber, spring means urging said piston to a position closing communication between said tractor and trailer ports, tractor and trailer supply ports in said housing in communication through said chamber, air pressure at said tractor supply port moving said piston to a position opening communication between said tractor and trailer control ports, a second housing separate from said first housing and having a chamber, an inlet port, exhaust port and a delivery port opening into said chamber, conduit means connecting said second housing delivery port and said first housing tractor supply port, a piston movable in said second housing chamber, spring means urging said second housing piston to a position opening communication between said second housing exhaust and delivery ports, air pressure at said second housing inlet moving said second housing piston to open communication between said second housing inlet and delivery port and to close communication with said second housing exhaust port.

2. The structure of claim 1 further characterized by and including a seal member carried by said first housing, a sealing surface carried by said first housing piston and urged into sealing relation with said seal by said spring means, the closing of said sealing surface upon said seal closing communication between said first housing tractor and trailer control ports.

3. The structure of claim 1 further characterized in that said first housing piston moves along an axis coaxial with said first housing exhaust port.

4. The structure of claim 3 further characterized by and including a peripheral groove about said first housing piston, said groove being on the side of said piston sealing surface away from said exhaust port and being formed and adapted to provide communication between said first housing tractor control and trailer control ports.

5. The structure of claim 1 further characterized by and including a dash control valve attached to said second housing, said second housing inlet being in communication with said dash control valve.

6. The structure of claim 5 further characterized in that said dash control valve has a chamber, a passage opening into said chamber, said second housing inlet including a portion extending into said passage and in communication with said dash control valve chamber.

7. The structure of claim 1 further characterized in that said second housing piston moves along a path generally coaxial with said second housing inlet.

8. The structure of claim 7 further characterized in that said second housing inlet and exhaust ports are generally in axial alignment.

9. The structure of claim 8 further characterized by and including spaced seal members carried by said second housing piston at opposite ends thereof, said seal members being positioned for sealing engagement with the walls of said second housing, an annular groove formed in said second housing piston intermediate said seal members for use in providing communication between said second housing delivery and inlet ports.

* * * * *